United States Patent [19]
Cunningham, Jr. et al.

[11] Patent Number: 5,335,394
[45] Date of Patent: Aug. 9, 1994

[54] EYEGLASS CLEANING APPARATUS

[76] Inventors: James W. Cunningham, Jr.; Barbara A. Cunningham, both of 3819 Florida Blvd., Palm Beach Gardens, Fla. 33410

[21] Appl. No.: 139,170

[22] Filed: Oct. 20, 1993

[51] Int. Cl.⁵ ............................................. A47L 5/38
[52] U.S. Cl. ......................................... 15/302; 15/310; 134/135
[58] Field of Search ................... 15/302, 310; 134/135

[56] References Cited
U.S. PATENT DOCUMENTS

| | | | |
|---|---|---|---|
| 3,172,416 | 3/1965 | Simmons | 134/135 X |
| 3,406,696 | 10/1968 | MacChesney et al. | 15/302 X |
| 3,464,080 | 9/1969 | Certo | 15/302 |
| 3,479,222 | 11/1969 | David et al. | 15/302 X |
| 3,480,022 | 11/1969 | Richardson et al. | 134/135 X |

*Primary Examiner*—Chris K. Moore
*Attorney, Agent, or Firm*—E. Michael Combs

[57] ABSTRACT

An apparatus wherein an oscillating motor and drive shaft arrangement selectively directs an eyeglass pair, and more specifically the lenses thereof, into a cleaning solution, having spherical resilient members therewithin to enhance cleaning. A timer mechanism after a predetermined timed event of cleaning maintains the lenses between front and rear walls of the entrance conduit into the fluid chamber, wherein heated drying air is directed onto the lenses of the eyeglass pair.

6 Claims, 4 Drawing Sheets

EYEGLASS CLEANING APPARATUS

BACKGROUND OF THE INVENTION

1. Field of the Invention

The field of invention relates to eyeglass cleaning apparatus, and more particularly pertains to a new and improved eyeglass cleaning apparatus providing for the oscillation of an eyeglass pair into a cleaning solution to enhance cleaning of lenses of the eyeglass pair.

2. Description of the Prior Art

Typical eyeglass cleaning, and more specifically cleaning of the lenses of an eyeglass pair, is undertaken by individuals in a manual manner providing inadequate surface cleaning of the lenses. Cleaning devices for such lenses has been indicated in the prior art in U.S. Pat. No. 3,480,022 as opposed to the manual cleaning of lenses as indicated in the U.S. Pat. No. 5,000,204.

The instant invention attempts to overcome deficiencies of the prior art by providing not only the agitation of a cleaning solution about eyeglass lenses but the oscillation of the lenses through the cleaning solution for enhanced cleaning and removal of cleaning solution from the lenses and positioning of the lenses for their subsequent drying and in this respect, the present invention substantially fulfills this need.

SUMMARY OF THE INVENTION

In view of the foregoing disadvantages inherent in the known types of eyeglass cleaning apparatus now present in the prior art, the present invention provides an eyeglass cleaning apparatus wherein eyeglasses are oscillated relative to a cleaning solution and are subsequently oriented for a drying relative to heated directed air onto the lenses. As such, the general purpose of the present invention, which will be described subsequently in greater detail, is to provide a new and improved eyeglass cleaning apparatus which has all the advantages of the prior art eyeglass cleaning apparatus and none of the disadvantages.

To attain this, the present invention provides an apparatus wherein an oscillating motor and drive shaft arrangement selectively directs an eyeglass pair, and more specifically the lenses thereof, into a cleaning solution, having spherical resilient members therewithin to enhance cleaning. A timer mechanism after a predetermined timed event of cleaning maintains the lenses between front and rear walls of the entrance conduit into the fluid chamber, wherein heated drying air is directed onto the lenses of the eyeglass pair.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved eyeglass cleaning apparatus which has all the advantages of the prior art eyeglass cleaning apparatus and none of the disadvantages.

It is another object of the present invention to provide a new and improved eyeglass cleaning apparatus which may be easily and efficiently manufactured and marketed.

It is a further object of the present invention to provide a new and improved eyeglass cleaning apparatus which is of a durable and reliable construction.

An even further object of the present invention is to provide a new and improved eyeglass cleaning apparatus which is susceptible of a low cost of manufacture with regard to both materials and labor, and which accordingly is then susceptible of low prices of sale to the consuming public, thereby making such eyeglass cleaning apparatus economically available to the buying public.

Still yet another object of the present invention is to provide a new and improved eyeglass cleaning apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
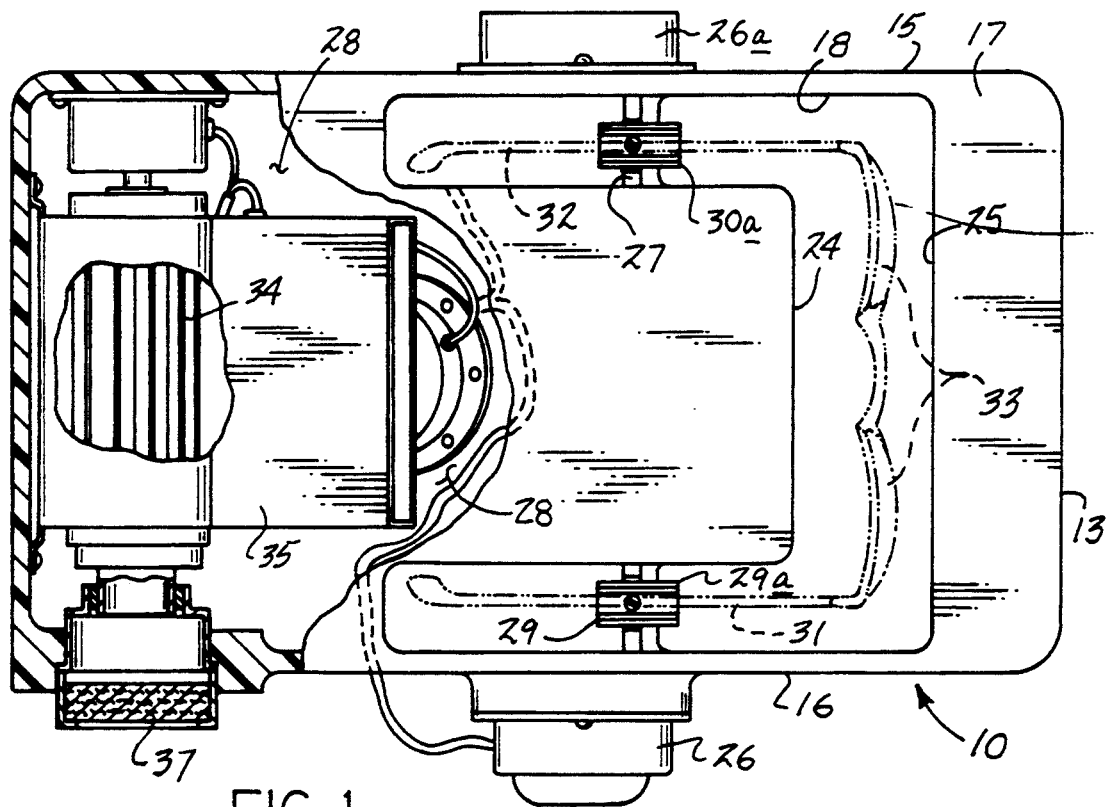
FIG. 1 is an orthographic top view of the invention.
Figure 2:
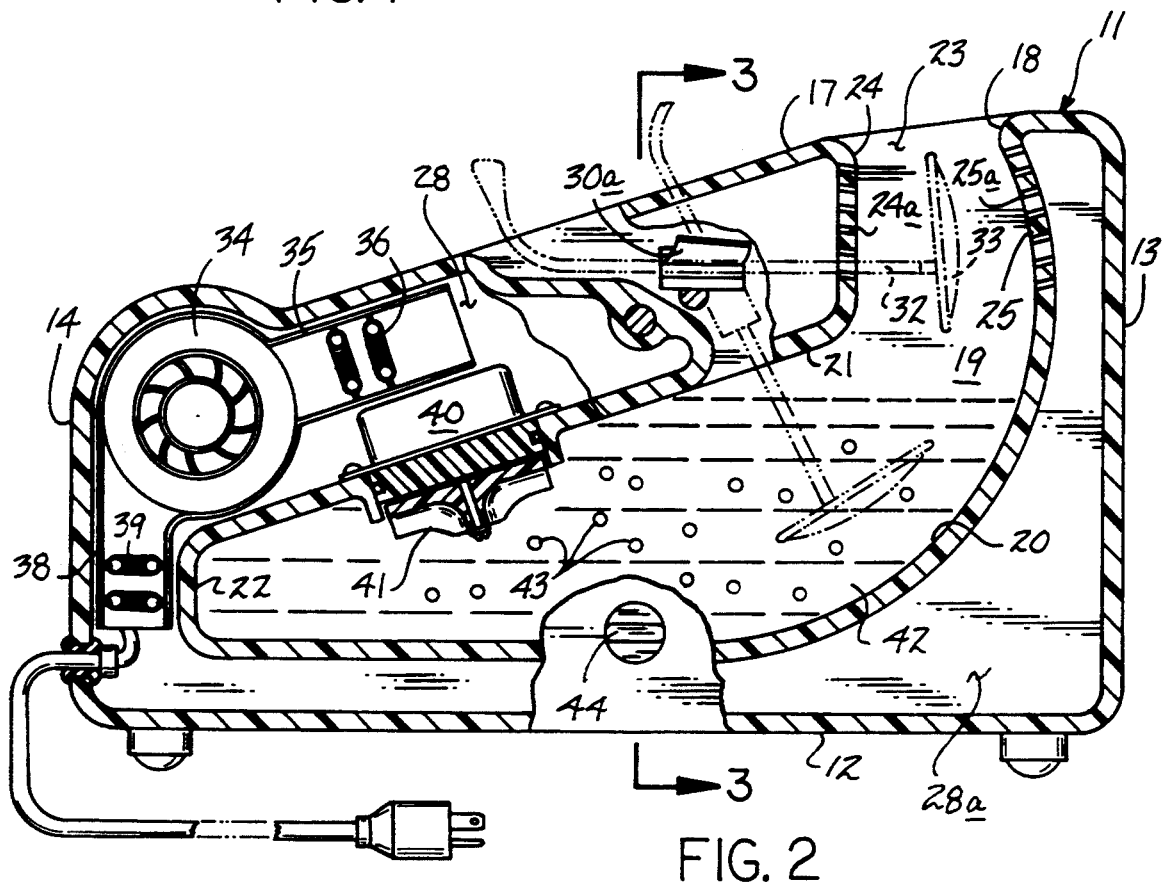
FIG. 2 is an orthographic cross-sectional illustration of the invention.
Figure 3:
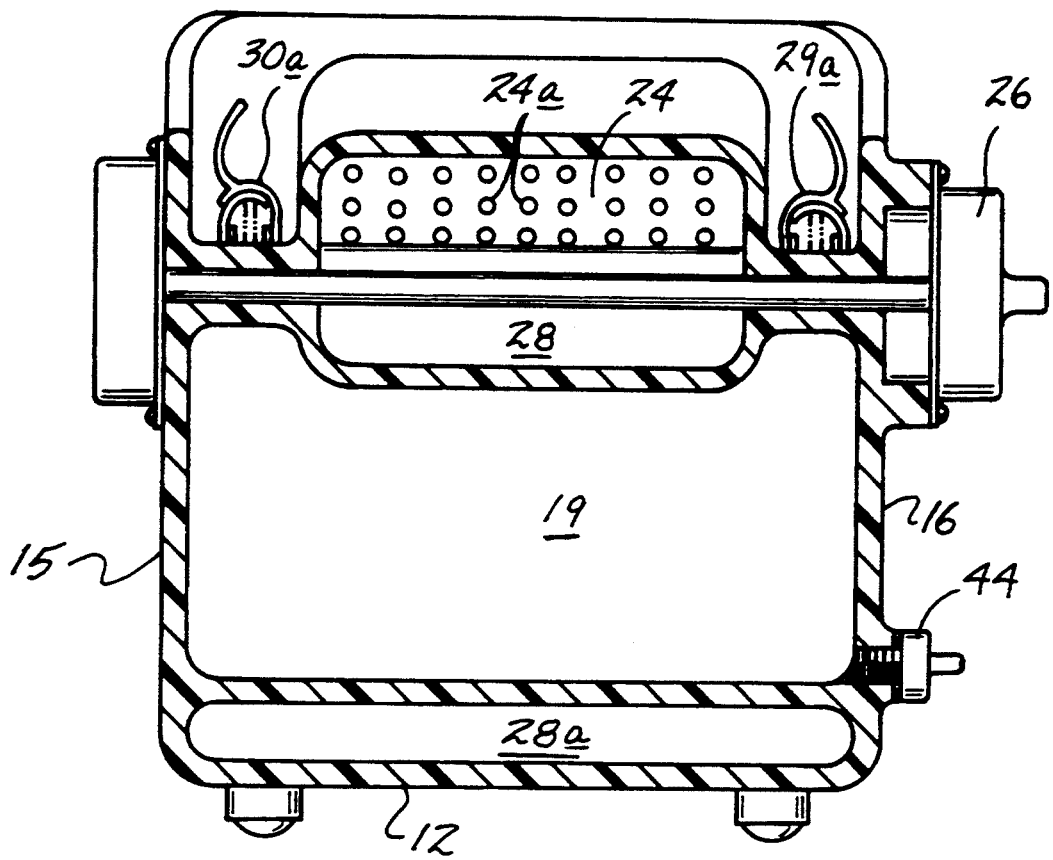
FIG. 3 is an orthographic view, taken along the lines 3—3 of FIG. 2 in the direction indicated by the arrows.

With reference now to the drawings, and in particular to FIGS. 1 to 6 thereof, a new and improved eyeglass cleaning apparatus embodying the principles and concepts of the present invention and generally designated by the reference numeral 10 will be described.

More specifically, the eyeglass cleaning apparatus 10 of the instant invention essentially comprises a housing 11 having a housing bottom wall 12 spaced from a housing front wall 13, a housing rear wall 14 spaced from a housing front wall 13, and first and second side walls 15 and 16 and spaced apart relative to one another, with a top wall 17 extending over the bottom wall 12 between the front and rear walls 13 and 14. The top wall 17 is arranged with a top wall U-shaped opening 18, with the U-shaped opening 18 having a first opening portion parallel to the front wall 13, with the U-shaped opening including second and third portions adjacent and parallel the respective first and second side walls 15 and 16 in communication with the first opening portion. As illustrated in FIG. 1 for example, the first portion receives the bridge work portion of the eyeglass assembly, while the second and third opening portions receive the legs of the eyeglass assembly directed therethrough. A fluid chamber 19 is positioned within the housing, having a chamber arcuate floor 20 spaced from the housing floor 12, with the chamber arcuate floor 20 extending along the housing front wall 13, with the fluid chamber 19 further having a chamber top wall 21 and a chamber rear wall 22. The chamber rear wall 22 is arranged in a spaced relationship relative to the housing rear wall 14, while the chamber top wall 21 extends along the housing top wall 17 and directed into an entrance conduit 23 that extends from the housing top wall to the fluid chamber 19, having entrance conduit rear wall 24 in communication with the fluid chamber top wall 21, with the entrance conduit front wall 25 extending to the fluid chamber arcuate floor 20. The entrance conduit rear wall includes rear wall openings 24a, with an entrance conduit front wall 25 including a matrix of front wall openings 25a. The rear wall and front wall openings 24a and 25a respectively are positioned on opposed sides of the eyeglass lenses 33 that are oriented, in a manner as indicated in phantom in FIG. 2, in a horizontal orientation prior to and subsequent the bathing procedure of the eyeglass assembly. The eyeglass assembly includes eyeglass first and second legs 31 and 32 that are arranged for mounting upon respective first and second clamps 29 and 30 that in turn are fixedly mounted to the drive motor shaft 27 of a self-reversing drive motor 26. The drive motor 26 may be either electrical or mechanical in nature. The drive motor 26 is arranged for oscillation of the drive motor shaft 27, wherein a timer mechanism 26a in electrical communication to the drive motor and in support of the shaft 27 (see FIG. 3) effects maintaining of the first and second clamps 29 and 30 in a horizontal orientation subsequent to the oscillation of the eyeglass assembly to present the eyeglasses, in a manner as indicated in phantom in FIG. 2, in the horizontal orientation from the bathing event and its oscillation within the cleaning fluid 42. It should be noted that the cleaning fluid 42 is formed with a plurality of resilient spheres 43 positioned therethrough. The resilient spheres 43 may be formed of a silicone-like material to enhance cleaning agitation onto the lenses of the eyeglass assembly. A drain plug 44 is arranged for projection through the second side wall 16 permitting ease of removal of the cleaning fluid from the fluid chamber 19 (see FIG. 3). Respective first and second clamps 29 and 30 include respective first and second clamp hook and loop fastener webs 29a and 30a (see FIG. 3) for securing of the respective first and second eyeglass legs to the respective first and second clamps.

A blower motor 34 is mounted within a first pneumatic chamber 28 positioned within the housing between the fluid chamber top wall 21 and the housing top wall 17, and extending from the housing rear wall 14 to the entrance conduit rear wall 24. A second pneumatic chamber 28a is positioned between the fluid chamber arcuate floor 20 and the housing bottom wall 12, with the second pneumatic chamber extending from there to an orientation along the housing front wall 13 extending to the entrance conduit front wall 25. The blower motor 34 includes a first outlet conduit 35 in a facing relationship relative to the entrance conduit rear wall 24 to direct heated air from the first outlet conduit 34 extending through first heating coils 36 that are in turn mounted within the first outlet conduit 35. A second outlet conduit 38 in communication with the blower motor 34 extends to pneumatic communication with the second chamber 28a, with the second outlet conduit 38 having second heating coils 39 therewithin to direct heated air into the second chamber 28a, and wherein the first and second chambers directs such heated air to the respective matrix of rear and front wall openings 24a and 25a. An inlet screen 37 projecting beyond the second side wall 16 directs filtered air into the blower motor, which is of a typical centrifugal type, and the blower motor of the invention including the first and second outlet conduits cooperating with respective first and second pneumatic chambers 28 and 28a respectively.

It should be further noted that an agitation drive member 40 projects into the fluid chamber 19, with the agitation drive member 40 having impellers 41 to effect agitation of the resilient spheres 43 within the cleaning fluid 42. The cleaning fluid 42 may be of any commercially available type for cleaning glass and the like.

Figure 4:
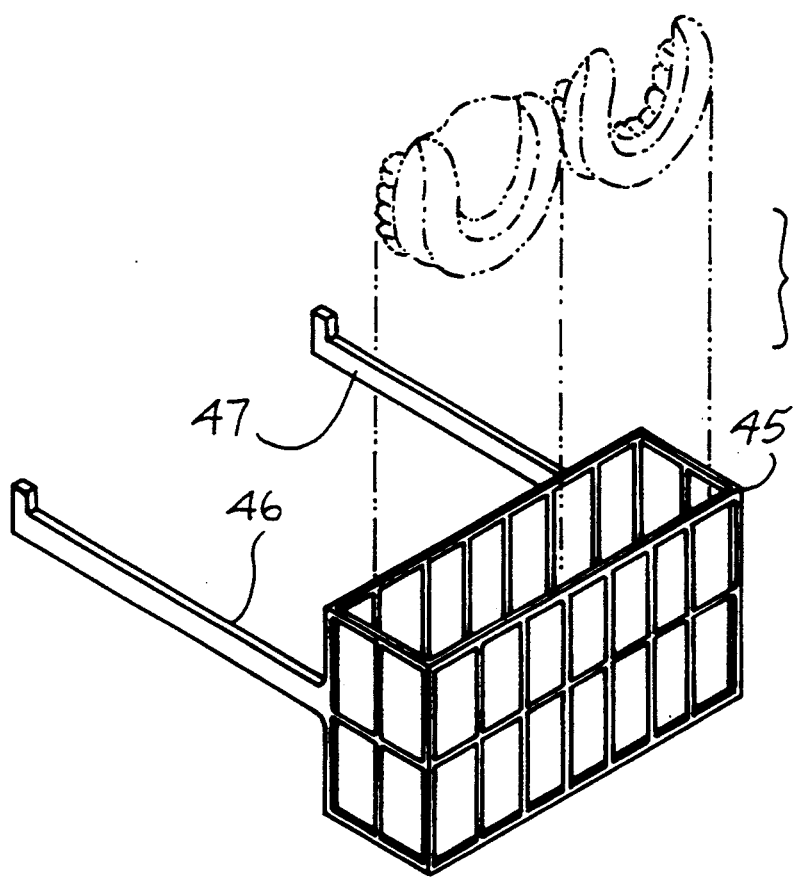
FIG. 4 is an isometric illustration of an accessory basket structure employed by the invention.
Figure 5:
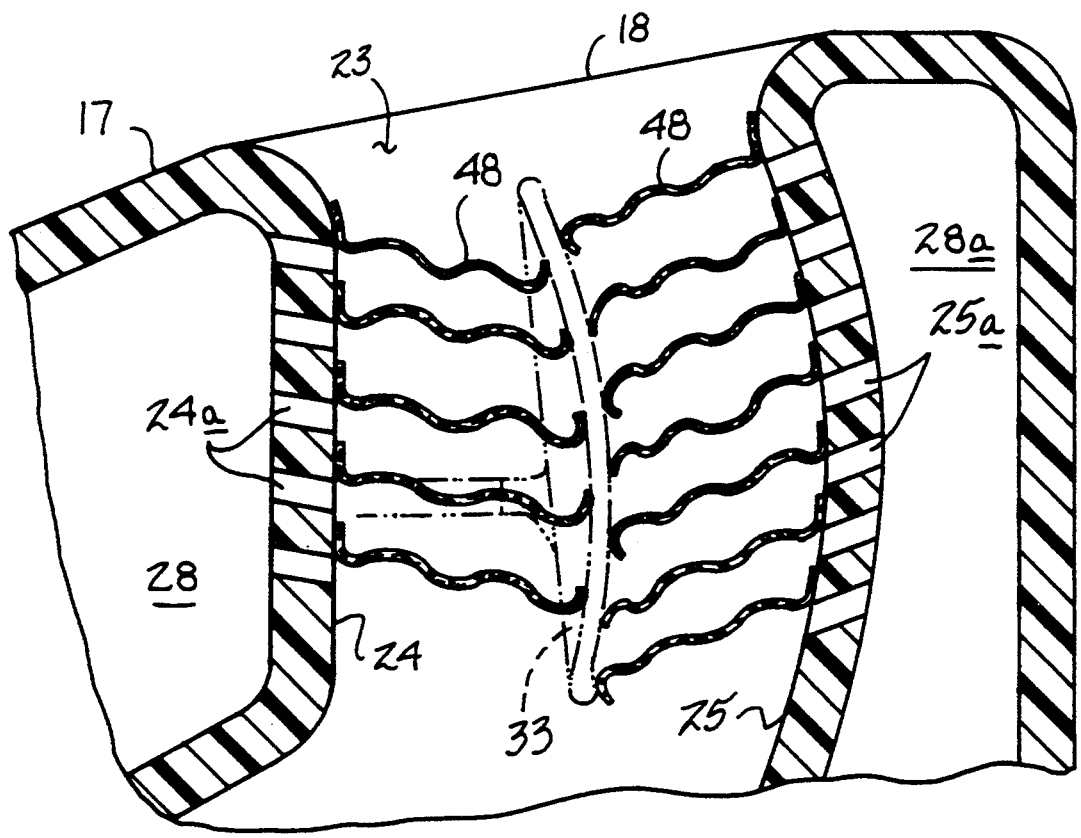
FIG. 5 is an orthographic cross-sectional illustration of accessory cleaning bristle members arranged for employment by the invention.

The FIG. 4 indicates the invention arranged to permit the cleaning of dentures and to this end, a basket 45 having respective basket first and second legs 46 and 47 is arranged such that the first and second basket legs 46 and 47 are arranged for mounting to the respective first and second clamps 29 and 30.

Figure 6:
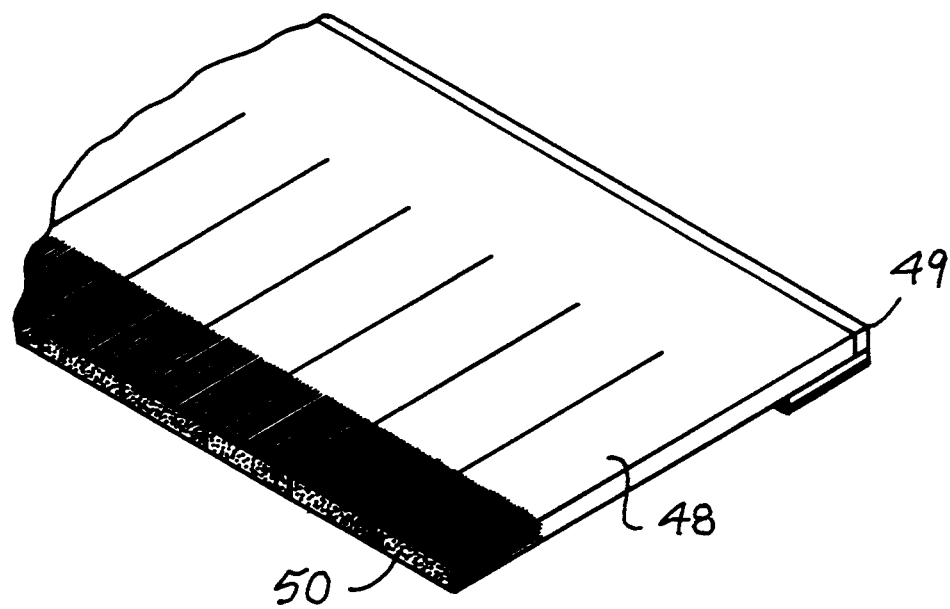
FIG. 6 is an isometric illustration of cleaning bristles arranged for severance and removal relative to a web.

The FIG. 7 indicates that the front and rear entrance conduit walls 24 and 25 are arranged to further include a plurality of resilient cleaning legs 48 extending therefrom, with the resilient cleaning leg extending from each of the entrance conduit rear and front walls 24 and 25 to engage the eyeglass lens. Each of the cleaning legs 48 are formed of a resilient material, having an adhesive rear end wall 49, such as indicated in FIG. 6, wherein a web of such resilient cleaning legs 48 as indicated are separated along the slots and adhered to respective front and rear walls by the adhesive or other desired mechanical connection. Resilient bristles 50 extend from the front end wall portion of each of the resilient cleaning legs 48. It should be noted that the resilient cleaning legs adhesive rear end walls 49 are arranged for mounting between individual ones of the respective rear and front wall openings 24a and 25a, as illustrated.

It should be noted that a timer mechanism is arranged to simultaneously effect actuation of the blower motor to permit subsequent drying of the eyeglass lenses subsequent to the oscillation of the eyeglass lenses within the cleaning solution. If desired to simplify operation of the device, the drying procedure to include the actuation of the blower motor may be operated in concert with the oscillation of the drive motor, but to minimize use of the blower motor, it is preferred to have the drying sequence occur subsequent to the oscillation of the eyeglass assembly within the cleaning solution.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An eyeglass cleaning apparatus, comprising,
a housing, said housing having a housing bottom wall spaced from a housing front wall, a housing rear wall spaced from said housing front wall, and a housing first side wall spaced from a housing second side wall, and a housing top wall extending over the housing bottom wall, the top wall including a top wall U-shaped opening extending into the housing, and
a fluid chamber mounted within the housing, with the fluid chamber in communication through the housing top wall to include an entrance conduit, with the fluid chamber including an arcuate floor spaced from the housing bottom wall extending along the housing bottom wall and spaced from the housing front wall, and
the fluid chamber having a fluid chamber rear wall spaced from the housing rear wall, and a fluid chamber top wall spaced from the housing top wall, with a first pneumatic chamber oriented between the housing top wall and the fluid chamber top wall, and a second pneumatic chamber oriented between the housing bottom wall and the fluid chamber arcuate floor, with the second pneumatic chamber extending between the fluid chamber arcuate floor and the housing front wall, and
the entrance conduit including an entrance conduit rear wall having rear wall openings in pneumatic communication with the first pneumatic chamber, and the entrance conduit having an entrance conduit front wall having front wall openings, with the front wall openings in pneumatic communication with the second pneumatic chamber, and blower means mounted within the first pneumatic chamber, the blower means having a first outlet conduit directing pressurized air to the rear wall openings, and a second outlet conduit in pneumatic communication with the blower motor directing pressurized air into the second pneumatic chamber and through the front wall openings, and
a self-reversing drive motor mounted to the housing, having a drive motor shaft, with the drive motor shaft extending through the housing first side wall and the housing second side wall, and the shaft having a first clamp and a second clamp, the top wall wall U-shaped opening including a first opening portion extending to the entrance conduit, and the top wall U-shaped opening including a second opening portion positioned in adjacency to the first side wall and a third opening portion extending in adjacency to the second side wall, with the first clamp mounted within the second opening, and the third clamp mounted within the third opening, with the first clamp and the second clamp arranged to secure respective first and second legs of an eyeglass assembly therebetween, with the eyeglass assembly including eyeglass lenses arranged for oscillation into the fluid chamber.

2. An apparatus as set forth in claim 1 wherein the fluid chamber includes a cleaning fluid therewithin, the cleaning fluid including resilient spheres positioned within the cleaning fluid.

3. An apparatus as set forth in claim 2 wherein the fluid chamber top wall includes an agitation drive member, and the agitation drive member including fluid impellers extending into the fluid chamber arranged to effect agitation within the fluid chamber.

4. An apparatus as set forth in claim 3 wherein the blower motor first outlet conduit includes first heating coils positioned therewithin, and the blower motor second outlet conduit includes second heating coils positioned therewithin to direct selective heated air into the first pneumatic chamber and second pneumatic chamber respectively.

5. An apparatus as set forth in claim 4 further including a basket, the basket including a basket first leg and a basket second leg, the basket first leg arranged for securement to the first clamp, and the basket second leg arranged for securement to the second clamp.

6. An apparatus as set forth in claim 5 wherein the entrance opening rear wall and the entrance opening front wall each include a plurality of resilient cleaning legs, with each resilient cleaning leg arranged for extension into the entrance conduit.

* * * * *